(12) United States Patent
Harper

(10) Patent No.: US 7,657,480 B2
(45) Date of Patent: Feb. 2, 2010

(54) DECISION SUPPORT SYSTEM AND METHOD

(75) Inventor: Charles N. Harper, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 1843 days.

(21) Appl. No.: 09/916,548

(22) Filed: Jul. 27, 2001

(65) Prior Publication Data

US 2003/0023466 A1    Jan. 30, 2003

(51) Int. Cl.
*G06Q 40/00* (2006.01)

(52) U.S. Cl. .................................. 705/37; 705/412
(58) Field of Classification Search ................ 705/7, 705/8, 10, 37, 35; 703/18; 700/286
See application file for complete search history.

(56) References Cited

U.S. PATENT DOCUMENTS 6,021,402 A * 2/2000 Takriti .................. 705/412
6,151,582 A * 11/2000 Huang et al. ............... 705/8

OTHER PUBLICATIONS

Sanderson, Joe ("Passing value to customers: on the power of regulation in the industrial electricity supply chain," Supply Chain Management, v4n4 pp: 199 1999 ).*

* cited by examiner

*Primary Examiner*—Ojo O Oyebisi
(74) *Attorney, Agent, or Firm*—Elwood L. Haynes; Donna Blalock Holguin

(57) ABSTRACT

A decision support system and method is provided for responding to a deregulated electrical energy environment for use in making decisions related to supplying and purchasing electrical power. In a preferred embodiment, the decision support system comprises a plurality of interconnected models that produce information related to various business operations. A contract valuation model produces a value of energy contracts based upon timely data such as contract terms, real-time commodity pricing, and forecasted commodity pricing. A potential action valuation model generates value for potential, predefined operational actions at a given production facility in response to a particular opportunity. A forecasting and planning model provides forecasting services related to energy based upon historical and current real-time data for use in other models. A supply chain optimizer provides overall supply information related to supplying a plurality of electrical generating facilities to thereby indicate economies for overall system operation. A risk management model allows the entry of risk tolerance parameters. A financial position management model is utilized as a tool to support risk reduction.

22 Claims, 5 Drawing Sheets

FIG. 5

ADD/EDIT LOCATIONS AND ASSETS

| OPPORTUNITY NO. | 12350 | 106 |
|---|---|---|
| LOCATION: | ABC COMPANY | |
| CUSTOMER: | EL PASO ENERGY | |
| PRODUCT | ELECTRICITY | 116 |
| OPP. START TIME: | 2/5/01 1:00 AM | |
| OPP. END TIME | 2/5/01 1:00 PM | |
| OPP. DURATION: | 12.0 HRS. | |
| MINIMUM MW: | 5 MW | |
| MAXIMUM MW: | 8 MW | |
| PRICE PER MW: | $200.00/MW | |
| OPP. VALUE: | $1,000.00 | 112 |

RECOMMENDATIONS — 108

| ACCEPT | SCENARIO | QUANTITY | COST | PROFIT |
|---|---|---|---|---|
| ⦿ | SCENARIO 1 | 5.02 MW | $172.00 | $828.00 |
| ○ | SCENARIO 2 | 5 MW | $172.00 | $828.00 |

118  110

REJECT — 114
ENTER REJECTION DETAILS HERE.

CLICK TO SELECT ANOTHER ACTION SCENARIO

DECISION SUPPORT SYSTEM AND METHOD

BACKGROUND OF THE INVENTION

1. Field of the Invention

The present invention relates generally to decision support systems and, more particularly, to systems and methods suitable for supporting decisions related to electricity production by power generation facilities that also sustain industrial production.

2. Description of the Background

The process of deregulation of the utility industry has already occurred in several states and there presently exists an increased trend toward deregulation throughout the United States. This change in regulatory environment creates the potential for altering the value of industrial power generation facilities which have been utilized for production support in businesses that require large amounts of electrical power such as air component separation facilities, oil field electric pump networks, refineries, iron production facilities, and the like. Such electrical generators may include cogenerators which produce electricity using waste heat (as in steam) from an industrial process or the use of steam from electric power generation as a source of heat. As well, the deregulation affects electrical generator plants that use more traditional forms of fuel or which have the capacity for using different types of fuel.

For companies which have developed their own electrical generation capacity, there may typically be several different types generating plants operating at the same general location, as well as numerous different locations with other generating plants. The generating plants may require different types of fuel and may typically have different generating capacities and outputs that may vary depending on the needs of the production facilities which such power generation plants sustain.

To improve the overall supply of electrical power available to the public as well as maintain power for sustaining industrial production introduces a need for handling the numerous factors for making the many electrical production decisions and electrical sales decisions. Such decisions may frequently need to be made within a time period of minutes to hours. For instance, decisions may be related to short term market circumstances during electricity peak loading. Despite the fluctuations in the available energy supply and costs of such electrical generation facilities due to many factors, and the fluctuating needs and prices of energy to sell, the decisions need to be made to profitably synchronize energy supplies and loads. The decisions should be made with the intent of increased likelihood of additional profits from electrical production facilities while avoiding potential financial risks and managing the supply of the various types of fuels to scattered electrical generation plants.

Consequently, there remains a need for a reliable, effective, procedural, reduced risk and decision support system and method suitable for handling the complex problems arising from changing the strategic importance of electrical generation facilities from production support to potential profit centers with additional electrical customers. Those skilled in the art have sought and will appreciate the present invention which addresses these and other problems.

SUMMARY OF THE INVENTION

The present invention was designed to provide greater control over faster changing industrial environments which will be created by increasing deregulation to thereby lowers costs, enhances communications and speed of operation, improves efficiencies and even increases public safety.

Therefore, it is an object of the present invention to provide an improved decision support system and method.

These and other objects, features, and advantages of the present invention will become apparent from the drawings, the descriptions given herein, and the appended claims.

The present invention provides a decision support system which may be used in supporting business units including electricity energy production operations, electricity energy contract sales, management, and supplies. The system comprises one or more elements such as, for instance, a contract valuation model for determining a value of existing and potential electrical energy contracts, a financial position management model for supporting purchases and sales of energy related financial instruments, a potential action valuation model for providing a value of potential short term electrical energy sales opportunities, a forecasting and planning model for providing forecasts of commodity prices utilized by the contract valuation model and the financial position model, a risk management model to provide risk tolerance factors for utilizing the forecasts, a supply chain optimizer model for optimizing supply routing and schedule, and a data delivery engine for supplying data to the contract valuation model, the financial position management model, the potential action valuation model, the forecasting and planning model, the risk management model, and the supply chain optimizer model.

In one embodiment, the potential action valuation model utilizes values from the contract evaluation model for comparison. Other elements may include data streams to the data delivery engine comprising customer data, asset data, vehicle data, real time commodity data, and weather data. Data streams from the delivery engine to the potential action valuation model may comprise commodity pricing, and asset data. Data streams from the data delivery engine to the contract valuation model may comprise real time commodity pricing, real time weather, and contract terms. Data streams from the data delivery engine to the supply chain optimizer may comprise delivery schedules, route information, and driver schedules.

A method for a decision support system for purchasing and selling electricity is provided that comprises one or more steps such as, for instance, providing a forecasting model for producing long term and short term forecasts of commodity prices utilizing historical and real time data, providing a contract evaluation model in communication with the forecasting model for evaluating existing and potential electrical delivery contracts based on real time commodity prices and forecasted commodity prices, providing risk tolerance model to enter risk tolerance criteria for use with the forecasted commodity prices, and providing a potential action evaluation model for evaluating a plurality of potential opportunities of sales of electricity with specific starting and ending times based on real time commodity prices and real time output capabilities of the electrical generating.

Other method steps may include displaying the plurality of potential opportunities of sales of electricity, the specific starting times and ending times with respect to costs and potential profits, and generating capacity and/or displaying potential opportunities of sales for a plurality of generating facilities and/or displaying a plurality of scenarios for at least one of the potential opportunities of sales. In one embodiment, method steps may comprise providing one or more electricity customers with access to the decision support system for the purpose of entering potential opportunities into the decision support system.

In a preferred embodiment the data delivery engine is provided to supply data to one or more models such as the forecasting model, the contract evaluation model, and the potential action evaluation model. The data delivery engine receives data related to asset profiles, real time commodity and weather data, and contract profiles. A supply chain optimizer is operable for monitoring supplies to a plurality of electricity generating units. The data delivery engine supplies data to the supply chain optimizer related to driver schedules, routes, customer profiles, and production information.

In other words, a decision support system is provided to support decisions related to generation and consumption of electrical power. The decision support system may comprise one or more elements such as a plurality of interconnected models wherein each model is operable for producing decision support. The plurality of interconnected models may comprise one or more models such as a contract valuation model for generating a value for existing and potential contracts for the electrical power, a potential action valuation model for generating a value for potential, predefined operation actions at a given production facility, a supply chain optimizer, a financial management model for use in managing ongoing use of financial positions related to energy commodities, a risk management model to allow entry of risk tolerance parameters, and a forecasting and planning model which supplies commodity forecast information to the contract valuation model and the financial position model.

BRIEF DESCRIPTION OF THE DRAWINGS

FIG. 5 is a computer screen view which provides details regarding a particular opportunity selected from the computer screen of FIG. 4.

While the present invention will be described in connection with presently preferred embodiments, it will be understood that it is not intended to limit the invention to those embodiments. On the contrary, it is intended to cover all alternatives, modifications, and equivalents included within the spirit of the invention.

DESCRIPTION OF THE PREFERRED EMBODIMENTS

Figure 1:
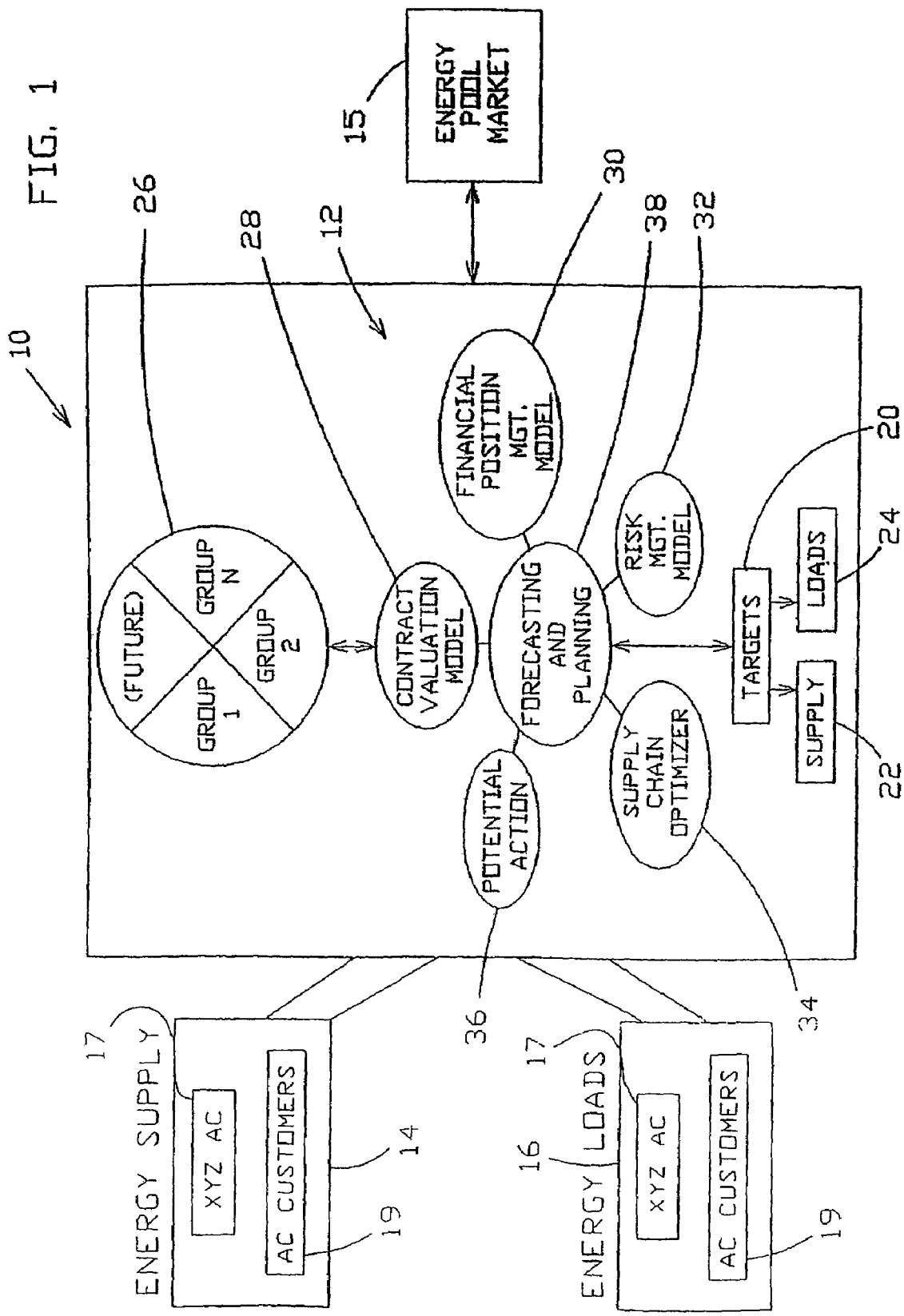
FIG. 1 is a schemmatical view disclosing a block diagram overview of several basic system components of a power system to be regulated with a decision support model in accord with the present invention.

Referring now to the drawings, and more particularly to FIG. 1, there is shown a block diagram of basic elements of power system 10 to be operated utilizing decision support system 12 in accord with the present invention. For companies which utilize their own generation facilities, and operate generation facilities for other companies, energy supply 14 may comprise numerous different types of generators having different generating capacities located over a wide range of areas. Energy supply 14 may include XYZ company 17 which utilizes decision support system 12. Energy supply 14 may also include AC customers of XYZ company whose facilities may include electrical power generators operated by XYZ company. Besides energy supply 14, the total energy supply also inherently includes energy pool market 15. Depending on factors input to decision support system 12, energy pool market 15 may at times be an attractive supply of energy loads and may be used for balancing supply and demand. Energy loads 16 may also include XYZ company 17. Thus XYZ company 17 may both supply and consume power. Energy loads 16 also includes AC power customers 19 as well as energy pool market 15. Thus, in accord with the deregulated energy system 10, the present invention contemplates that many net suppliers of electricity may also at times be net users of electricity. Decision support system 12 optimizes decisions related to such circumstances. General targets are available for loads and supply as indicated in FIG. 1 at 20, 22, and 24. Targets 20 may typically be a variable target based on demand for the products produced by the company, seasonal factors, weather factors, risk factors, and the like as discussed subsequently. The various generating plants or groups of generating plants and related industrial production contractual relationships are indicated at 26 and may include many different electric power generation plants and/or future plants to be built based upon anticipated long term supply and demand. The basic modules of decision support system 12 are preferably a contract valuation model 28, financial position management model 30, risk management model 32, supply chain optimizer 34, potential action valuation model 36, and forecasting and planning models 38. The basic modules and their interconnections are discussed in more detail subsequently.

Figure 2:
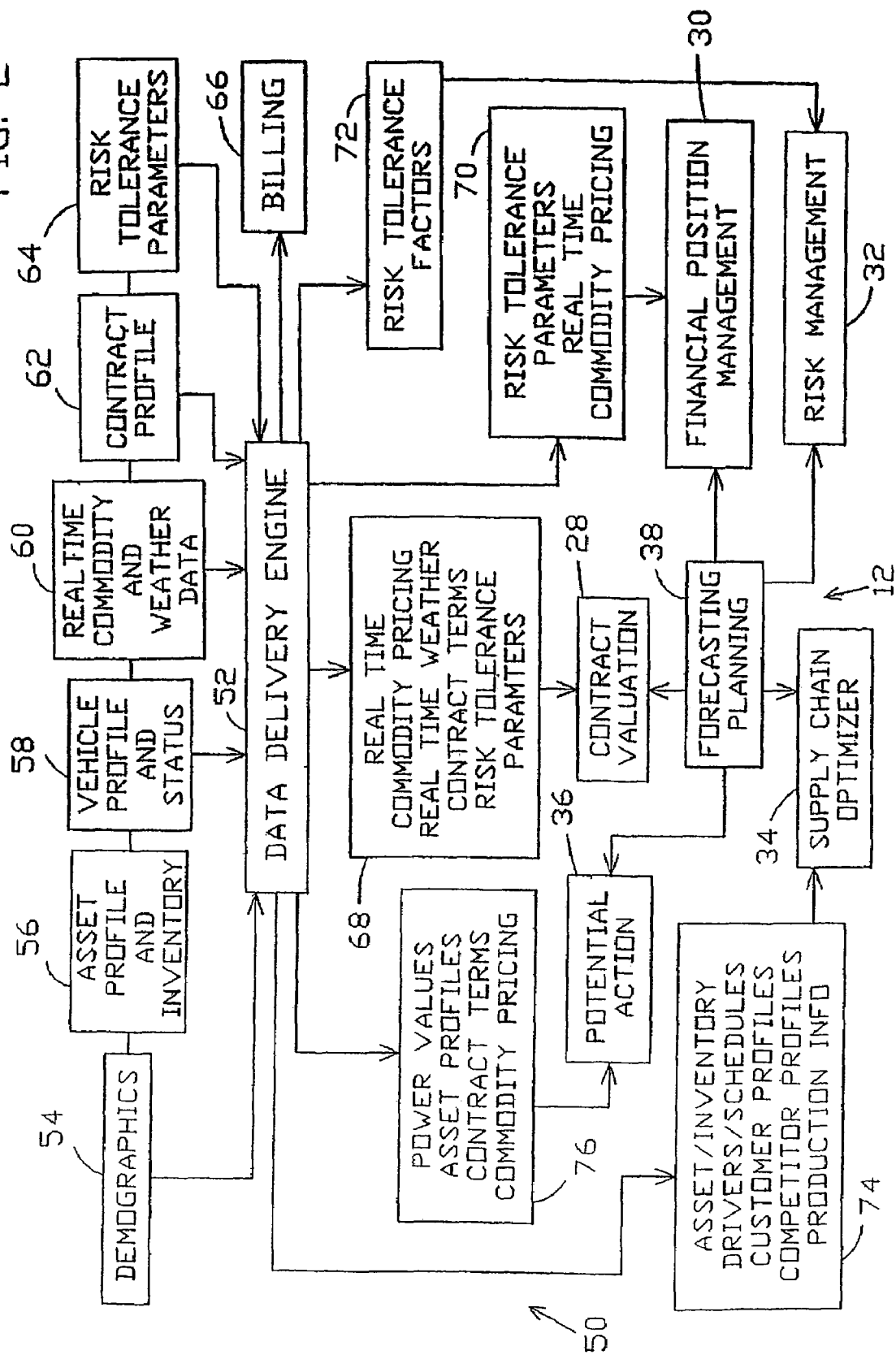
FIG. 2 is a schemmatical view disclosing a block diagram of basic information flow into a decision support system in accord with the present invention.

FIG. 2 provides some indication of the types of data which must be evaluated in decision making in data delivery system 50. The types of data relate to key indicators and business drivers as determined by the inventors and which are utilized by the interactive models of decision support system 12. It will be understood that such data tends to be massive and may comprise real time data that changes in real time, predictive data, and/or stored data. Data delivery engine 52 is used to receive raw data from many sources, process and catalog the data and make the data available for use in decision support system 12. Thus, data delivery engine 52 provides significant storage capacity as well numerous inputs and outputs which may be high speed data channels as necessary.

Various types of raw data are supplied to data delivery engine 52 including customer demographics information 54 which includes data such as customer lists, competitor information, locations, past purchases, projected energy needs including long term, seasonal, weather or other event related, anticipated future purchases including contract data, and the like as necessary, along with additional data discussed subsequently, e.g., weather temperature, that may be used to predict short term and long term anticipated loads and/or supply of electricity. Asset profile and inventory 56 may typically include the various power generation facilities, the generating capacities which may vary due to types of fuel used, weather, power costs which may vary due to output, fuel prices, power history production, and the like. Fleet data 58 includes vehicle profiles and status, routes, alternative routes, drivers, driver schedules, and the like which is useful for the shipping which must normally be utilized for various purposes such as repairs, fuel supplies and types, and the like. Real-time process and production data 60 includes real time power values and real time production and may include parameter variations due to changing conditions including stator temperature, rotor temperatures, power factors, fuel levels, scheduled maintenance, system status, and the like as needed to determine present output and present capacity. Contract data 62 provides information about electrical power purchases and requirements that have already been made, the factors under which the terms vary, the price of power under the contract, and the like which will go to defining the load, and where applicable any additional supply. Risk tolerance factors 64 include the various risk levels which are permitted, e.g., what percentage of future supply may be sold ahead of time without determining the future supply that must be supplied to fill a long term contract.

Thus, the above data is placed in data delivery engine 52 for processing and organization to be readily available in the desired formats for use with the group of models that comprise decision support system 12. For instance, contract valuation model 28 may receive combined data as indicated in 68 such as real-time commodity pricing, real-time weather and predicted weather, contract terms, and risk tolerance factors. Financial position management model 30 may receive data 70 such as real-time commodity pricing and risk tolerance factors. Risk management model 32 may receive data 72 such as risk tolerance factors. Supply chain optimizer 34 will utilize data factors 74 such as asset/inventory, driver schedules, customer profiles, competitor profiles, production information and the like. Potential action valuation model 36 may utilize data factors 76 such as real time power values, asset profiles, contract terms, real time commodity pricing, and the like. As well, billing 66 conveniently receives the billing data needed for billing customers.

Figure 3:
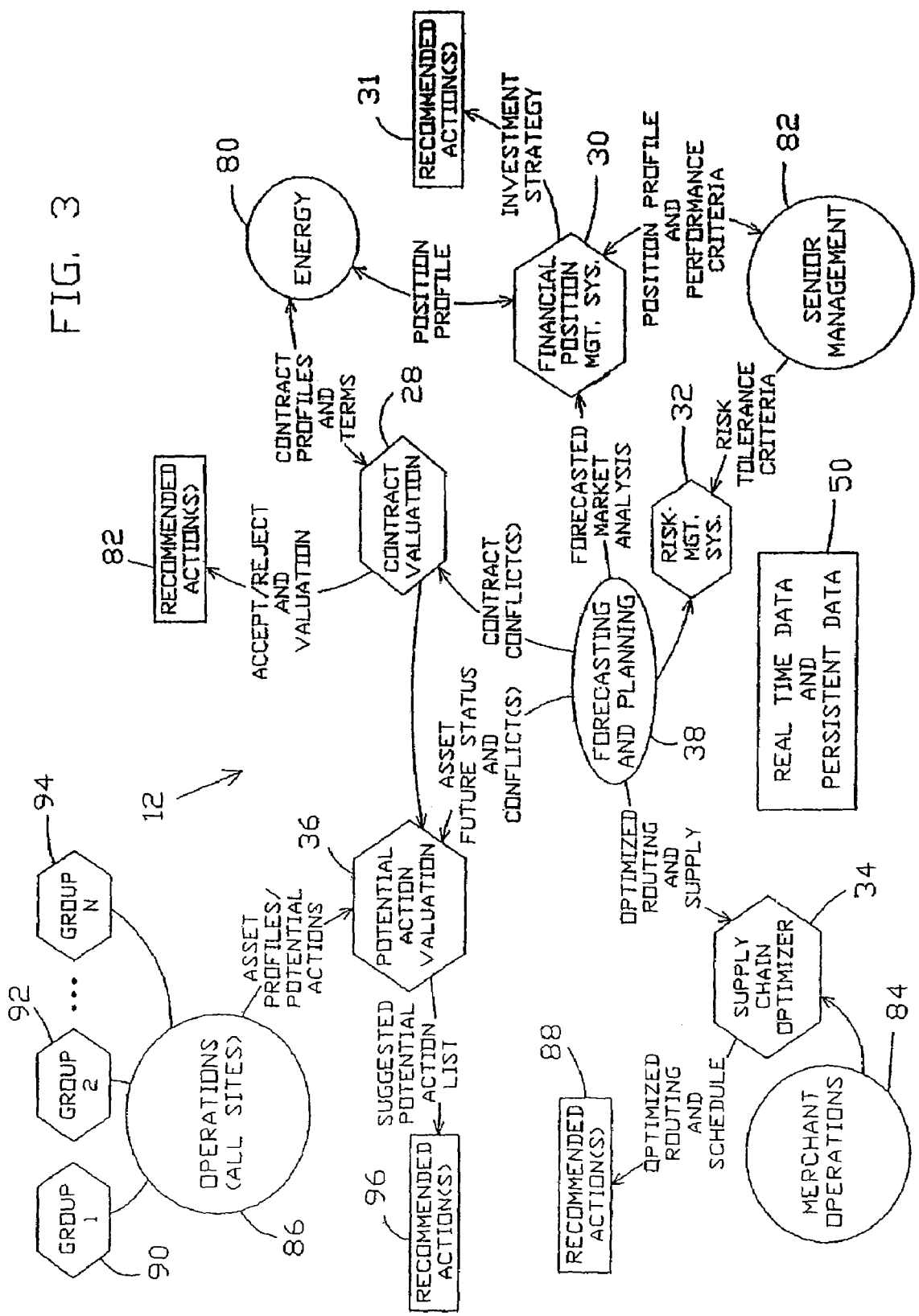
FIG. 3 is a schemmatical view disclosing a process model of the decision support system in accord with the present invention.

In FIG. 3, an overview is provided regarding the operating modules of decision support system 12. It will be understood that decision support system 12 receives the data discussed above and delivered within data delivery system 50. Although the structure of a company which could make use of various components of a decision support system 12 in accord with the various invention, for complete utilization of decision support system 12 such a company may preferably have several different basic segments. Group 80 may be referred to an energy group. Energy group 80 is in contact with the energy customers, and is responsible for making contracts with the customer. Energy group 80 may also take financial positions in the futures market. Thus, the employees of energy group 80 will frequently utilize contract valuation model 28 and financial position management system 30. Contract valuation model 28 essentially generates the value of energy contracts based upon the contract terms and real-time data such as real-time commodity prices as well as forecasted commodity prices. Note that contract valuation model 28 may be utilized for both sales and purchase of energy as the system is both a user and supplier of energy. Thus, model 28 may be utilized as an interface for managing wholesale trade/swaps to optimize overall system economies. As well, leverage may be obtained through overall system total energy usage and supply to provide power cost reductions through negotiations and bundling. This provides the users with the ability to compare the benefits and drawbacks of proposed energy contracts.

In a preferred embodiment, contract valuation model 28 permits the user to enter Awhat if@ scenarios to provide insight into the anticipated effect of the contract terms. The contracts may have various provisions which may include base energy needed, variable energy demand terms required under specific circumstances and/or during certain times of the day or seasonal demands. The various terms such as starting dates, ending dates, termination provisions, cost variations due to different quantities of energy consumed, and the like, may be part of an energy supply contract profile data. Thus, contract valuation model provides output 82 which evaluates/determines the value of existing contracts and provides accept/reject information to potential contracts and/or the terms thereof.

Financial position management model 30 may also be utilized by energy group 80 and/or senior management 82. One very desirable use of financial position management model is to support risk reduction through management of financial positions. As the use of financial instruments in the energy commodities futures markets increases, it is believed that there will be an increased necessity or desire for reducing, or theoretically completely eliminating the risks. Model 30 will enable the development and implementation of financial strategies for securing financial positions. Financial position management model 30 will also allow the user a convenient interface for entering, reviewing, and managing the ongoing use of financial positions. Financial position management system produces recommended actions as indicated at 31. For instance, hedging of prices may be used to lock energy prices which will guarantee profits. Forecasted market analysis would provide insights into the timing of entering commodity contracts in accord with risk tolerance criteria and policies that are developed. Since it would be anticipated that the company is both a user as well as a provider of electricity, the possibilities and complexities of such commodity hedging practices could ideally yield higher prices for sales of energy and lower prices for purchases.

Senior management 82 would be responsible for setting up risk tolerance criteria and performance criteria as well as monitoring position profiles. A large part of this function is accomplished through risk management system 32. Risk management model 32 allows the entry of risk tolerance and avoidance parameters to formally establish guidelines around the business process for energy management. For instance, given the assumption that forecasts provide useful probabilities but are typically not precisely accurate, and may in fact be in error, specific strategies would be produced for limiting the risk, and perhaps potential profit, of relying on such forecasts. Moreover, forecasts may include long term and short term predictions, perhaps based on long term and short term weather predictions, all of which require and may utilize different types of risk reduction procedures and policies. Risk management model 32 will receive data which is feedback regarding the application of risk reduction constraints and strategies as they are applied and executed by decision support system 12. Thus, risk management model 32 may be utilized to implement thresholds and policy to be written to support strategic use of commodities and energy contracts without incurring undue risk to the enterprise. In the process of monitoring success of operations, the information may also be utilized to more effectively determine working capital improvement opportunities.

Merchant operations 84 relates generally to purchases of services and goods utilized in providing energy to customers. Goods may include components, spare parts, unfinished goods, finished goods, fuels, inventories, and the like as necessary. A significant aspect of services may include transportation such as fleet management and/or other types of deliveries. Merchant operations 84 may typically interact with supply chain optimizer model 34. For instance, real time fleet tracking data may be utilized whereby transport locations, time of arrivals, routes, and the like are available for view. Such monitoring may also include that of shipping and air travel when relevant. In some cases, it may be desirable to check temperatures or other operate functions within units that are being transported as well as provide alerts regarding road problems and the like. It is anticipated that since overall flow data is available that relatively small changes in logistics and policies that will become apparent through an overall company wide interface to all merchant data can lead to dramatic improvements in overall efficiency. Monitoring and tracking will also provide the ability to handle outages and disruptions quickly. For instance, the location, schedule and the like of transports and drivers will be available for faster and more economical control. As well, the needs/timing of customers and operations are provided through this interface. Preferably supply chain optimizer will provide the ability to perform what if/trade off analysis. Such analysis can be used to lay the foundation for future on-line modeling and optimization techniques. Thus, the ability to test solutions prior to implementation is a preferred feature of supply chain optimizer 34 as indicated at 88. The various agents which work together in the supply chain may include energy 80, plants and/or operations 86, plant tanks, drivers, fleets, trucks, ships, customer tanks, and the like.

Figure 4:
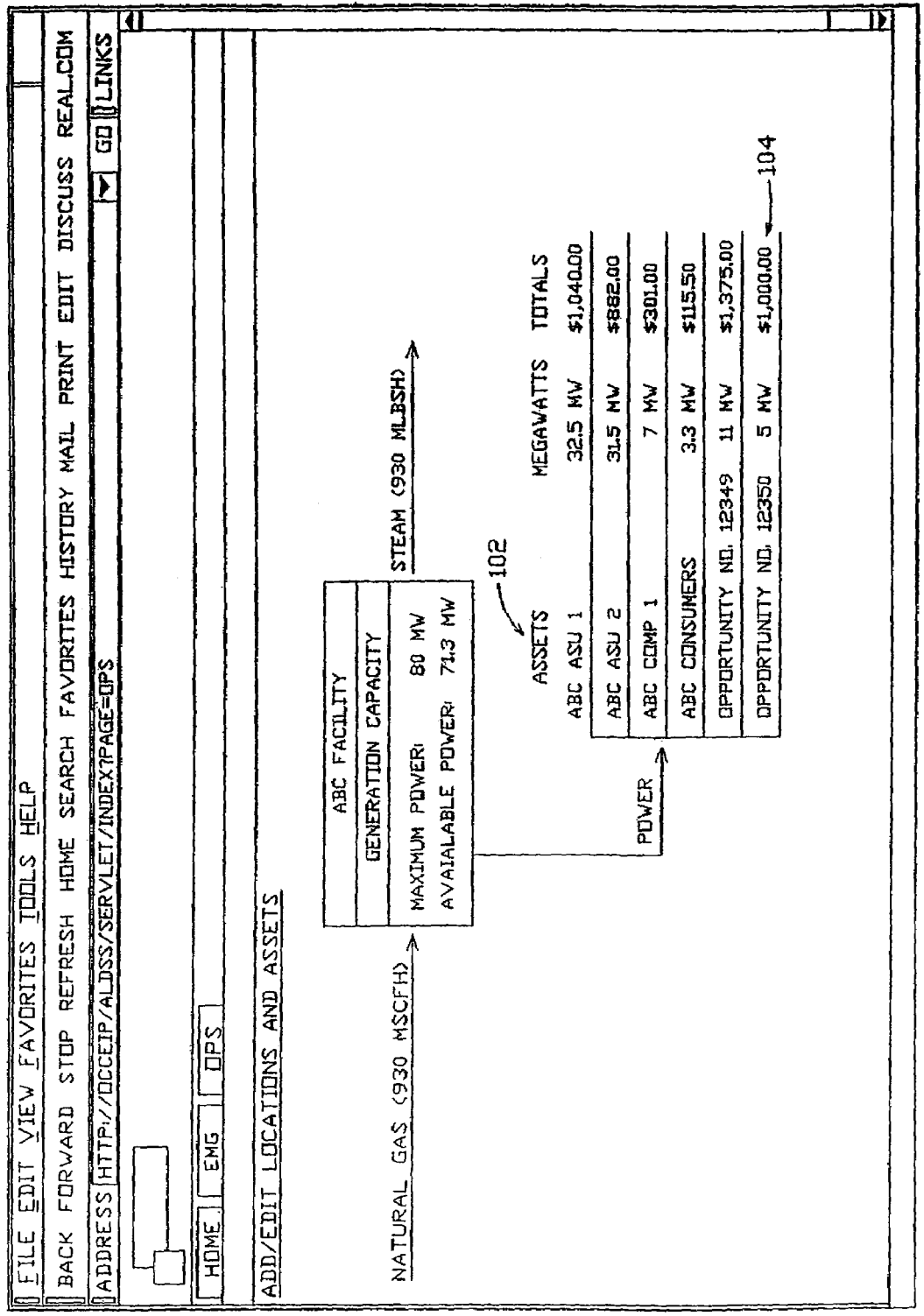
FIG. 4 is a computer screen view which provides decision support for particular demand/supply status.

Operations 86 is responsible for operating the electric generation facilities and/or other plant operations as desired. Thus, operations 86 may be responsible for different facilities some of which may include one or more electrical generation plants as indicated as groups 1, 2, . . . N at 90, 92, and 94, respectively. Operations will frequently utilize potential action valuation model 36. Potential action valuation model produces a value for potential, predefined operation actions at a given production facility in response to a particular opportunity. For instance, the local power utility may become aware of a need for a certain number of megawatts for a specified time period. In a preferred embodiment, frequent customers may be provided with access to the computer system to enter potential opportunities and thereby receive timely responses by computer. Thus, one embodiment would allow customers limited access to the system for the purpose of entering opportunities and retrieving acceptance/rejectance of such opportunities. Additionally, potential action valuation model 36 can place a value on potential actions that can be taken at multiple facilities, provide statistical and graphical results, and suggest operational actions. One or more potential actions can be selected for implementation through potential action valuation model 36 as indicated at 96. While potential action model 36 may be utilized to produce various computer interface screens, an example is shown in FIG. 4 for a facility or group view of opportunity such as might be available at group 1, 2, . . . N, as indicated in FIG. 3 at any facility 90, 92, or 94. It will be understood that other models will use similar appropriate computer screens providing the information as discussed above. For potential action evaluation model 36, the computer screen of FIG. 4 may show the various assets at a particular facility as listed at 102 when viewing the screen for that particular facility. Company wide assets may also be shown in other screens. Information such as types of fuels at rates may be seen, e.g., natural gas (930 MSCFH). The maximum power and available power is viewable along with the various types of generating capacities. Various opportunities may also be viewable as indicated at 104. Clicking on line 104 might then reveal a computer screen such as that of FIG. 5 which provides more details as to the type of opportunity, customer at 106, anticipated profits 108, costs 110, total revenue 112, times 116, quantities 118, various scenarios as indicated at 114. Other computer screens might include opportunity registration screens where data concerning the opportunity may be input. In one embodiment, potential customers may be provided with access to such screens to thereby automatically enter the system and receive feedback on acceptance of the opportunity. A list of reviewed opportunities may be provided. Maps of the various facilities and/or their locations may be provided. Potential action valuation model 36 may utilize information from contract valuation model to compare the value to existing contracts, manage wholesale trades/swaps to optimize the overall system which is both a user and supplier. Moreover, potential action valuation model 36 may be utilized to provide input to contract valuation model 28 for execution in terms of volume discount contracts and provide price flexibility to avoid lost sales to resellers of electricity.

Forecasting and planning model 38 interacts with all models such as contract valuation model 28, financial position management system model 30, risk management system 32, supply chain optimizer 34, and potential action valuation model 36. Forecasting and planning module 38 provides forecasting services based upon historical and current real-time data. In one embodiment, complexity science based forecasting methods are utilized. For instance, forecasting model 38 may be utilized to forecast values based on commodity futures pricing over a specified period of time and analyze the data relative to actual historical price movement and the benchmark forecasts. Thus, the general accuracy of the model can be computed by using historical data. Forecasting and planning model 38 also provides a software execution and planning service to guide and manage decision support system 12 operationally. In a preferred embodiment, forecasting and planning model 38 allows decision support system 12 to iteratively process real-time data so that real-time risk mitigation and opportunity identification can be automatically implemented. Thus, the present invention provides a means for optimizing response of energy producing/purchasing companies to changes due to a deregulated energy market. Decision support system 12 assists in synchronizing energy supply and energy loads and assists in setting achievable targets related thereto. An advantage of the present invention is that the means are provided for acting on short term market circumstances such as during electricity peak loads. A corporate byproduct of the present invention is the enablement of corporate cultural and procedural changes in key decision making changes. Decision support system 12 allows a more thorough understanding of complex interrelationships throughout multiple business units.

In operation, forecasting and planning model 38 provides short term and long term forecasts of anticipated energy loads which are related to supply and demand. Thus, demographics, weather conditions, economic conditions both in the U.S. and globally are all factors which may be utilized in this process. As well forecasting and planning model 38 provides long term and short term forecasts of commodity prices such as energy related commodities. Such forecasts may be utilized in contract evaluation model 28, financial position management system 30, risk management system 32, supply chain optimizer 34, and potential action valuation 36. Risk management system 32 may be utilized to reduce risk when hedging, buying, and/or selling energy when using forecasts such as through financial position management system 30, contract valuation model 28, and potential action valuation 36, planning for supplies and deliveries in supply chain optimizer 34, and evaluation of potential actions in model 36. Forecasting and planning model 38 may be used to point out contract conflicts that may arise, e.g., over or under selling/buying of power required by customers. Forecasting and planning model 38 may be used to determine when additional power generating capacity should be acquired, built, or sold.

In summary, the present invention has been found to provide an effective method and system for rapidly making complex decisions based on evaluating a large number of changing factors. While the present invention optimizes operations based on energy deregulation, the invention may be applied to other types of business operations including those related to various commodities. The foregoing disclosure and description of the invention is illustrative and explanatory thereof, and it will be appreciated by those skilled in the art, that various changes in the organization, flow paths, the use of equivalents, as well as in the details of the illustrated construction or combinations of features of the various elements may be made without departing from the spirit of the invention.

What is claimed is:

1. A computer-implemented method for identifying an excess energy capacity in a production supply chain operated by a supply chain operator, comprising:
   identifying, by a supply chain optimizer, a potential production configuration for the production supply chain, wherein:
   (i) the supply chain operator also operates at least one power generation facility to sustain industrial production by the production supply chain,
   (ii) the supply chain operator is capable of both consuming and selling electricity produced by the power generation facility while operating the production supply chain,
   (iii) the potential production configuration is related to a target electricity production by the power generation facility, and
   (iv) the potential production configuration reduces a production output and energy consumption for at least some portion of the production supply chain or increases electricity production by the power generation facility during a given time period;
   determining, using a potential action valuation model, whether to reduce the production output of the production supply chain or increase electricity production by the power generation facility according to the potential production configuration to create the excess energy capacity during the time period; and
   if production output is determined to be reduced or electricity production by the power generation facility is determined to be increased, selling the excess energy capacity created by implementing the potential production configuration during the time period for the production supply chain and the power generation facility.

2. The method of claim 1, wherein the potential action valuation model determines whether to reduce the production output of the production supply chain using a risk management model.

3. The method of claim 2, wherein the risk management model may be configured according to a set of risk tolerance criteria and risk performance criteria.

4. The method of claim 1, wherein the forecasted price for electricity during the time period is determined using a forecasting and planning model utilizing historical and real-time data.

5. The method of claim 1, wherein, if production output is determined to be reduced, prior to the time period, increasing the production output of the supply chain to prepare of the reduced production of the supply chain for the time period.

6. The method of claim 1, wherein a data delivery engine is configured to supply real-time data to the potential action valuation model, the supply chain optimizer, the forecasting and planning model, and the risk management model.

7. The method of claim 6, wherein the real-time data includes real-time commodity prices for electricity.

8. A computer-readable storage medium containing a program which, when executed, performs operations for identifying an excess energy capacity in a production supply chain operated by a supply chain operator, the operation comprising:
   identifying, by a supply chain optimizer, a potential production configuration for the production supply chain for a supply chain, wherein
   (i) the supply chain operator also operates at least one power generation facility to sustain industrial production by the production supply chain,
   (ii) the supply chain operator is capable of both consuming and selling electricity produced by the power generation facility while operating the production supply chain,
   (iii) the potential production configuration is related to a target electricity production by the power generation facility, and
   (iv) the potential production configuration reduces a production output and energy consumption for at least some portion of the production supply chain or increases electricity production by the power generation facility during a given time period where a contracted price for the electricity exceeds a forecasted price;
   determining, using a potential action valuation model, whether to reduce the production output of the production supply chain or increase electricity production by the power generation facility according to the potential production configuration to create the excess energy capacity for the production supply chain during the time period; and
   if production output is determined to be reduced or electricity production by the power generation facility is determined to be increased, selling the excess energy capacity created by implementing the potential production configuration during the time period for the production supply chain and the power generation facility.

9. The computer-readable medium of claim 8, wherein the potential action valuation model determines whether to reduce the production output of the production supply chain using a risk management model.

10. The computer-readable medium of claim 9, wherein the risk management model may be configured according to a set of risk tolerance criteria and risk performance criteria.

11. The computer-readable medium of claim 8, wherein the forecasted price for electricity during the time period is determined using a forecasting and planning model utilizing historical and real-time data.

12. The computer-readable medium of claim 8, wherein, if production output is determined to be reduced, prior to the time period, the operations further include increasing the production output of the supply chain to prepare of the reduced production of the supply chain for the time period.

13. The computer-readable medium of claim 8, wherein a data delivery engine is configured to supply real-time data to the potential action valuation model, supply chain optimizer, forecasting and planning model, and the risk management model.

14. The computer-readable medium of claim 13, wherein the real-time data includes real-time commodity prices for electricity.

15. A computing device, comprising:
   at least one processor; and
   a memory, wherein the memory includes a plurality of models, which when executed by the processor, are configured to identify an excess energy capacity in a production supply chain operated by a supply chain operator, including:
   a supply chain optimizer configured to identify a potential production configuration for the production supply chain, wherein:

(i) the supply chain operator also operates at least one power generation facility to sustain industrial production by the production supply chain, (ii) the supply chain operator is capable of both consuming and selling electricity produced by the power generation facility while operating the production supply chain, (iii) the potential production configuration is related to a target electricity production by the power generation facility, and (iv) the potential production configuration reduces a production output and energy consumption for at least some portion of the production supply chain or increases electricity production by the power generation facility during a given time period where a contracted price for the electricity exceeds a forecasted price;

a potential action valuation model configured to determine whether to reduce the production output of the production supply chain or increase electricity production by the power generation facility according to the potential production configuration to create the excess energy capacity for the production supply chain during the time period; and a data delivery engine configured to supply real-time data to the potential action valuation model and to the supply chain optimizer.

16. The computing device of claim 15, wherein the potential action valuation model determines whether to reduce the production output of the production supply chain using a risk management model.

17. The computing device of claim 16, wherein the risk management model may be configured according to a set of risk tolerance criteria and risk performance criteria.

18. The computing device of claim 15, wherein the forecasted price for electricity during the time period is determined using a forecasting and planning model utilizing historical and real-time data.

19. The computing device of claim 15, wherein the real-time data includes real-time commodity prices for electricity.

20. The method of claim 1, wherein the production supply chain comprises one of an air component separation facility, an oil field electric pump network, a refinery, and a metal ore production facility.

21. The computer readable storage medium of claim 8, wherein the production supply chain comprises one of an air component separation facility, an oil field electric pump network, a refinery, and a metal ore production facility.

22. The computing device of claim 15, wherein the production supply chain comprises one of an air component separation facility, an oil field electric pump network, a refinery, and a metal ore production facility.

* * * * *